Oct. 2, 1951     J. MARTIN     2,569,638
CONTROL MEANS FOR USE WITH EJECTION SEATS OF AIRCRAFT
Filed Nov. 28, 1949     7 Sheets-Sheet 1

Inventor
JAMES MARTIN.
per Worth Wade
Attorney.

FIG. 3.

Oct. 2, 1951 — J. MARTIN — 2,569,638
CONTROL MEANS FOR USE WITH EJECTION SEATS OF AIRCRAFT
Filed Nov. 28, 1949 — 7 Sheets-Sheet 5

Inventor
JAMES MARTIN.
per Worth Wade
Attorney.

FIG. 13.

Oct. 2, 1951     J. MARTIN     2,569,638
CONTROL MEANS FOR USE WITH EJECTION SEATS OF AIRCRAFT
Filed Nov. 28, 1949     7 Sheets-Sheet 7

Inventor
JAMES MARTIN.
per Worth Wade
Attorney.

Patented Oct. 2, 1951

2,569,638

UNITED STATES PATENT OFFICE 2,569,638

CONTROL MEANS FOR USE WITH EJECTION SEATS OF AIRCRAFT

James Martin, Higher Denham, near Uxbridge, England

Application November 28, 1949, Serial No. 129,745

13 Claims. (Cl. 244—122)

This invention relates to control means for regulating the descent by parachute from an aircraft by means of an ejection seat of the kind in which the seat and its occupant is arranged so that in an emergency it may be ejected clear of the aircraft by the force of an explosive charge acting in an ejection gun forming part of the seat structure, as described in my Patent No. 2,527,020.

An object of the present invention is to provide an arrangement and method of automatic control of the parachute descent apparatus whereby the pilot or other occupant of the ejection seat is relieved of all but the initial act of bringing the apparatus into operation and at the same time the various steps in the functioning of the apparatus will be carried out automatically in the correct sequence and timing to ensure the safe execution of what might otherwise be a somewhat hazardous operation especially in connection with an emergency descent from a very high speed aeroplane of the fighter type.

This and other objects and advantages obtained with the invention will become apparent from the following description taken in connection with the accompanying drawings wherein the invention is shown in the preferred form.

A practical example of an ejection seat and allied parts embodying the constructional features and advantages of the present invention is illustrated in the accompanying drawings and in the detailed description thereof.

The general arrangement of the seat is somewhat similar to that described and illustrated in the complete specification and drawings of the co-pending Patent application referred to above, in so far as the main features of the seat are retained, viz., the main ejection gun, the drogue and drogue gun, the adjustable seat pan, floating footrest and protective face screen are all incorporated, but with the additional features or modifications forming the subject matter of the present invention.

Figures 1, 2:
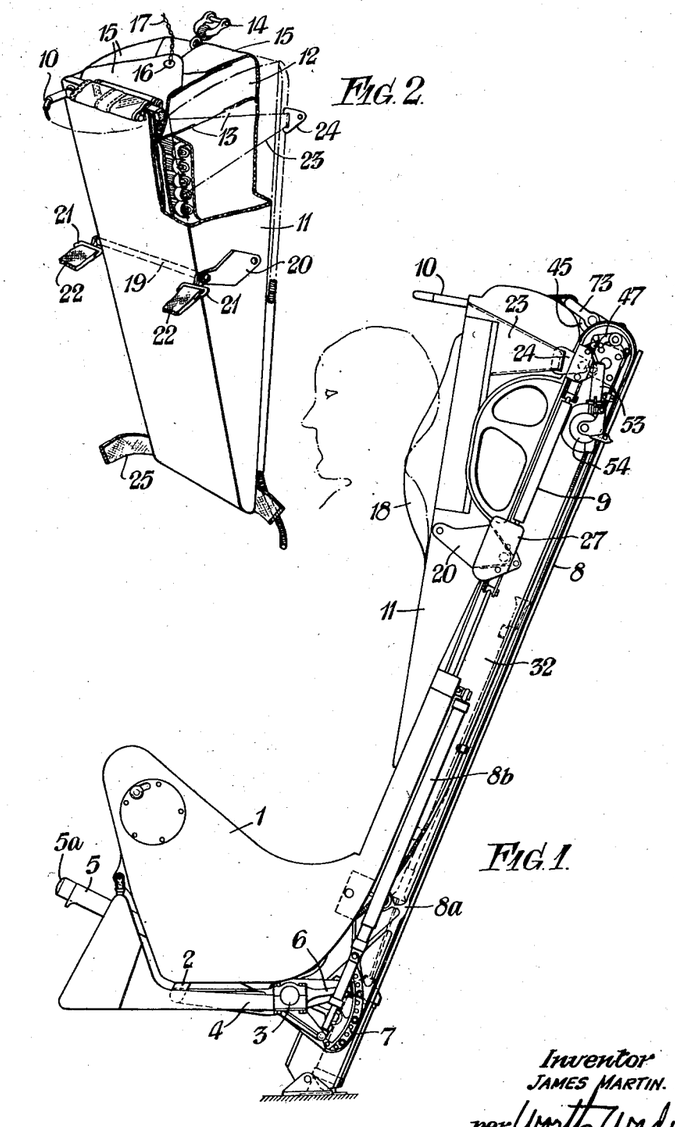
Fig. 1 is a side view of the ejection seat.
Fig. 2 a perspective view of a parachute pack.

Dealing now with the main features illustrated in Fig. 1 a seat 1 is slidably mounted for adjustment. Within the hollow pan of the seat is a channel shaped stiffening member beneath which are secured lugs 2. Mounted to turn in bearings in the ends of a tubular distance piece is a shaft 3 on which is fixedly mounted lever arms 4 whose outer ends are pivotally engaged in the lugs 2. A diagonal strut connects the inner end of one of the lever arms with the outer end of the other lever arm so as to impart stiffness to the structure and avoid side sway of the seat. On one end of the shaft 3 is secured a hand lever 5 by which the seat may be raised or lowered. To permit this and as illustrated in the drawings of the pending application short channel guides are provided on the outer face of each frame member and inwardly directed abutments each supported on a pivotal shaft in the upper end of the seat back, engage in these guides to provide a sliding and pivotal connection between the upper end of the seat back and the frame members of the frame. The seat 1 is supported by the lugs 2 pivotally connected to the forward ends of the lever arms 4 fixed on the hollow shaft 3. Each of the lever arms 4 has a rearward extension 6 the end of which extends close to a quadrant 7 one of which is provided on each of the frame members and a locking catch is provided on each extension 6 to engage in any pair of holes in the quadrants 7 to secure the seat 1 in any position to which it may be adjusted by the hand lever 5. The locking catches are controlled by a press knob 5a.

Floating footrests are arranged beneath the front of the seat.

The ejection gun for ejecting the seat from the aeroplane is located between the fixed guide 8 and the seat frame 8a. A pair of compression springs 8b are connected at each end to fixed pins on the seat back and on the frame members respectively. The drogue gun is indicated by 9. A handle 10 is connected to a protective face screen which is releasably secured at one end to the seat or to the parachute pack. This handle is intended to be grasped by both hands of the occupant of the seat, so that the act of drawing the protective screen into position automatically locates the occupant's hands and arms in a compactly folded position against the body at the same time that the firing mechanism is actuated to eject the seat and occupant from the aeroplane.

In the construction illustrated in Fig. 2 the main parachute is packed in the lower compartment 11 of a wedge shaped pack mounted between similarly shaped side members at the top of the seat frame behind the pilot and this pack serves as a back support and head rest. The drogue parachute is contained in a compartment 12. Dividing these compartments are four triangular flaps 13 secured by a detachable pin or other suitable means. 14 is a drogue shackle, referred to later, and an extension of the drogue cable from the shackle is attached to the pin and thence through the flaps to the top of the canopy of the main parachute. Enclosing the upper or drogue compartment and forming a top to the wedge shaped pack are four flaps 15 similarly secured, the securing pin 16 in this case being connected to a drogue gun piston by a double length of nylon cord 17 which is also connected to the drogue parachute. A second pin securing the top flaps is connected to a manual rip cord. The withdrawal of either of these pins is sufficient to ensure the release of the drogue parachute from its compartment in the pack. The drogue shackle 14 is connected to the ejection seat.

A head pad 18 may be provided adapted to fit into the nape of the neck where it gives maximum support and the greatest degree of comfort to the head.

On the front face of the pack at the top is situated the firing handle 10 attached to the face screen.

A cross tube 19 is built into the pack. Pivoting on each end of this tube is an attachment plate 20. Means 21 are provided for picking up the shoulder straps 22 of the safety harness. The function of the cross tube is to prevent the pack being thrown forward if the aircraft should make a crash landing. Attachment plates on the harness straps and the pack are plugged into locks provided for them on the main frame of the seat and they, together with the cross tube, form a cantilever structure which serves to support the pack vertically, i. e., the pack is prevented from sliding upwardly or downwardly. A webbing strap with attachment plates 24 which also plug into locks on the main frame of the seat prevents the pack bending forward above the cross tube in a crash landing or when the firing control handle is pulled.

At the bottom of the pack a strap 25 is attached which when engaged in suitable buckles on the safety harness serves as a belt. This, together with the aforementioned shoulder straps ensure that the pack is securely attached to the pilot.

It may be mentioned here that the pack and harness per se form the subject matter of a copending application for patent.

Figures 7, 8:
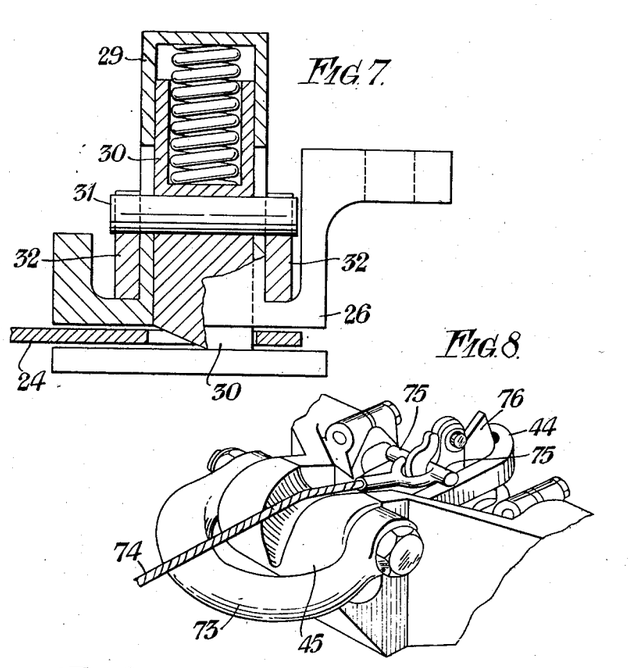
Figs. 8 and 9 are views of the drogue shackle and allied components.

There will now be described the means provided to attach the parachute pack and the pilot to the seat. This is effected by a system of locks illustrated in Figs. 3, 4, 5, 6 and 7. These are placed on the forward outer face of the main seat frame and are arranged in line. The top pair of locks 26 are at the upper part of the frame, the second pair 27 are level with the lower cross member of the parachute pack. The third and lower pair of locks 28 are built into the seat pan. The upper pair of locks 26 (Fig. 5 and 7) are similar and consist of a housing 29 in which a spring loaded latch 30 slides freely. Through the barrel of the latch and normal to the longitudinal axis is a pin 31 which projects at either side. The projecting portions of the pin engage on the sloping faces of a double sear bar 32 which moves vertically in slots situated on either side of the latch 30. The sear bar 32 is secured to a lock control linkage 34. The pressure of the sloping faces on the pin 31 during upward movement of the sear bar causes the latch barrel to move inwards counter to the spring. When the projecting outer end of the latch is completely withdrawn into the bore of the housing 29 the harness attachment plates are free.

Due to the movement of the adjustable seat pan 1 relative to the fixed main frame it is necessary to arrange that the lower pair of locks 28 should be operable in any position of adjustment of the seat pan whilst still permitting the seat pan to be removed if and when required, without having to disconnect or interfere with the lock control linkage in any way. This is effected by means of a moving channel 32a (Fig. 6) sliding within a fixed channel 33 with the webs thereof opposed. The channels are of sufficient length to cover the range of adjustment of the seat pan. The outer channel is fixed to the forward outer face of the seat main frame 40 at the lower end. The inner channel is slidably engaged within the said outer channel and is attached at its top end to the lower extremity of the lock control linkage 34. Two fixed members 35 in the outer channel engage in two pairs of angular slots 36 in the flanges of the inner channel 32. Pressure of the angular slots on the fixed bearings during upward movement of the inner channel cause it to ride partially out of engagement with the outer fixed channel.

Figures 4, 5, 6:
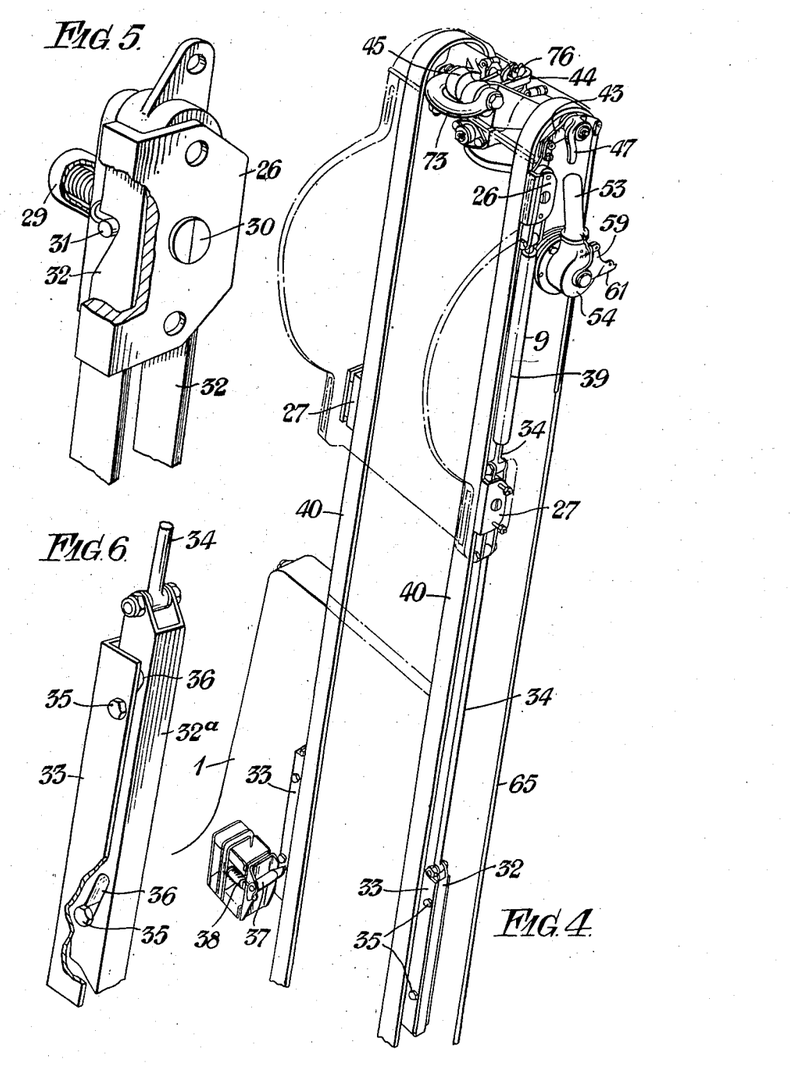
Figs. 4, 5, 6 and 7 also show parts of the locking devices and the time controlled device.

This outward movement is transmitted to the locks 28 in the seat pan by means of a reversing bell crank lever 37 which is attached at its other end to the latch spindle 38. Outward pressure of the inner channel causes partial rotation of the bell crank and this withdraws the latch of the lock in the seat pan thus freeing the attachment plates of the harness lap straps.

Figure 3:
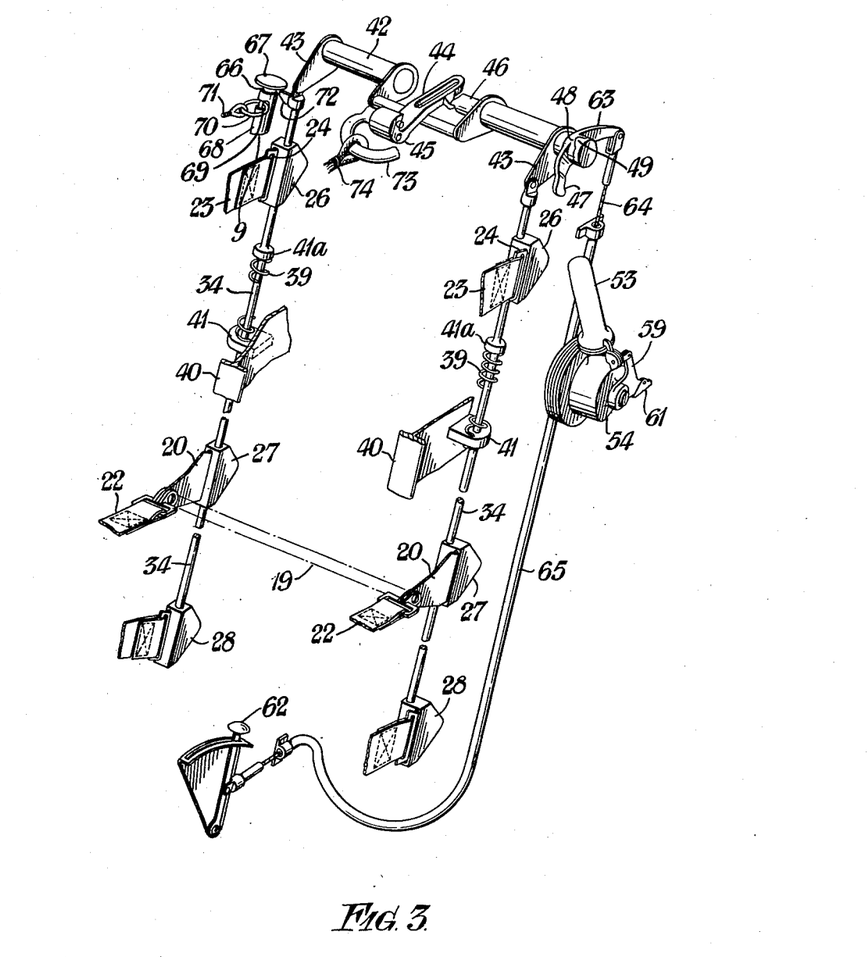
Fig. 3 is a perspective view of the locking devices and allied parts.

Between and in line with the upper pairs of locks a spring cartridge 39 is attached to a main frame component 40 on each side of the seat. Its lower end abuts against a lug 41 through which the linkage 34 passes. A disc 41a bears against the top end. This disc compresses the spring when the locks are set to locking position.

Synchronisation and control of the locks is effected by means of a cranked cross member or torque shaft 42 mounted in bearings on the top cross beam of the main frame of the seat and free partially to rotate (Fig. 3). At each end of the cranked cross member a short lever 43 projects forward and is connected to the upper end of the double sear bars or linkages. From this it will be seen that partial forward rotation of the shaft 42 will have the effect of compressing the springs 39 and setting the locks into the locking positions, i. e., ready to receive the harness attachment plates.

To keep the locks in this position it is necessary to hold down the cranked portion of the top cross member. This is one of the functions of the split tail portion 44 of the drogue attachment hook 45 which lies across the cranked portion of the member 42 and straddles the sear and firing pin of the main ejector gun. The tail portion 44 is in turn held down by a spring loaded latch 46 which lies axially in one of the hollow half shafts of the member 42. When a lever 47 which is fixed to the other end of the latch spindle is partially rotated a cam face 48 on the spindle engages a fixed cam face 49 on the outer end of the hollow half shaft and effects the withdrawal of the latch 46, the split tail portion of the drogue attachment hook flicks upward and forward. Due to the action of the springs aforementioned, which normally are exerting a force on the cranked cross member, the freeing of this member allows the springs to extend thus disengaging simultaneously the six locks.

From the above it will be seen how the disengagement of the locks is controlled by one spring latch 46 with its attached lever projecting from a hollow half shaft of the top cross member 42. This lever in the example described is in turn controlled by a time-delay device governed by a barostat.

In the case of ejection from a high altitude a time delay device and a barometric control work in combination, whereas when ejection is made at low altitude the barometric control is not effective, so that it may be omitted altogether on low flying machines.

Figure 10:
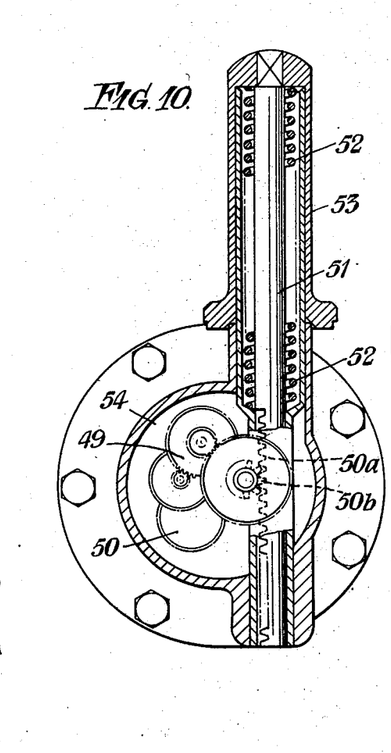
Figs. 10, 11 and 12 illustrate the time controlled and barostat devices.
Figures 11, 12:
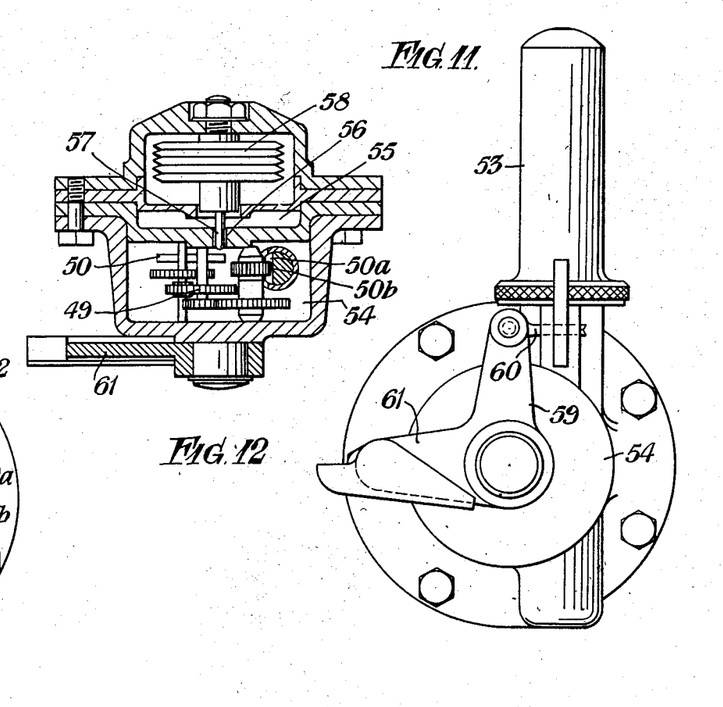

One form of time delay mechanism and barometric control is illustrated in Figs. 10 to 12 inclusive.

The time delay mechanism comprises a train of gears 49 and an escapement 50 driven by a rack 50a and pinion 50b, the rack being on a spindle 51. The operating power is derived from a spring 52 which surrounds the spindle 51 and is housed in a sliding barrel 53. The upper end of the rack spindle 51 is attached to the barrel 53, so that when the barrel is pushed upwards by the reaction of the spring on the gear housing, the rack spindle is drawn upwards with it thus setting the gears in motion at a rate controlled by the escapement. Thus by varying the initial setting of the barrel to the gear housing the time of operation may be varied from zero to a maximum, in the present case nine seconds with the spring barrel in its lowest position, i. e. nearest to the gear housing.

The housing of the delay device consists of two separate compartments 54 and 55, the one 54 containing the gearing being as completely sealed as possible so as to exclude dust and moisture.

The two compartments are bolted together and through the dividing walls a small aperture 56 is made to permit the ingress to the gear compartment of a pin 57 which is attached to the barostat capsule 58. Normally this pin 57 does not interfere with the operation of the gears, but at high altitude the prevailing low pressure permits the barostat capsule to expand thus causing the pin to advance into the escapement and preventing the gears from working. As the pressure of the atmosphere increases on descending the capsule begins to collapse and eventually the pin is withdrawn and the gears are free to work.

Mounted on the outer face of the housing is a lever 59 to one arm of which is attached a pin 60. This pin secures the barrel in its predetermined position relatively to the housing. The other arm 61 of the lever projects to the rear where it can strike a fixed projection in the cockpit on ejection of the seat thus rotating the lever and withdrawing the pin 60 and setting the delay mechanism in motion. The speed of movement is controlled by the gearing driven from the rack spindle.

Having withdrawn the pin 60 the barrel moves upwards until it contacts and rotates the latch spindle lever 47 thus withdrawing the latch 46 following which the disengagement of the locks takes place as referred to previously.

An overriding manual control may be provided to allow a pilot to detach himself and his parachute from the seat so that in the event of any breakdown in the sequence of operations, or indeed, even before the ejection squence is initiated, the pilot's freedom of action is restored.

A manual control lever or handle 62, mounted in a convenient position on the seat pan (see Fig. 3) is connected to a rearward extension 63 of the latch spindle lever 47 by means of a flexible cable 64 housed in a flexible conduit 65. Movement of this control lever 62 thus permits operation of the locks independently of the time delay mechanism.

The manual control may be arranged to operate the locks by direct connection after releasing the latch, thus rendering the mechanism independent of the operating springs.

Referring to Fig. 3 the piston 66 of the drogue gun has a spring loaded hook or cap 67 sliding within a sleeve 68 which is slotted laterally at 69 about halfway through. A metal ring 70 attached to a flexible connector, for example a double nylon cord 71, from the drogue parachute is introduced into the slot 69 when the hook or cap 67 is pulled upwards against its spring. On releasing the hook 67 the ring is trapped in the slot and the only movement necessary to release it is slightly to raise the hook, the ring then disengages. This raising is normally performed by a projection 72 from the double sear bar of the lock control linkage on the drogue side of the seat. The purpose of this will be dealt with later when describing manual release from the seat.

On deciding to abandon aircraft at a high altitude the pilot would jettison the cockpit hood, assume the correct posture for ejection, feet on footrests, etc., grasp the firing handle 10 and, keeping elbows well to his side pull down the face screen. The means by which the seat may be launched from the aircraft is described in the prior patent application referred to in the opening paragraph of the present specification.

As the seat 1 moves upwards the locking pin 60 on the time delay mechanism would be withdrawn. But as the aeroplane is at a high altitude the barrel 53 would not move because the pin 57 of the barostat is interfering.

Before the seat is completely out of the cockpit an emergency supply of oxygen, carried in a bottle in the seat pan forward of the usual carried dinghy and under a pad is turned on automatically. When the seat is a predetermined distance away from the cockpit a static line or other device fires the drogue gun. The drogue gun piston flies upwards pulling out the pin 16 securing the top flaps 15 of the parachute pack and then pulling out the drogue parachute which develops instantly and stabilises the seat and slows it up. The drogue is attached to the seat by means of a shackle 73 engaged in the releasable drogue attachment hook 45.

The descent of the seat at a high speed (possibly 150 m. p. h.) continues in this manner until a lower predetermined altitude is reached. By this time the pressure of the atmosphere is sufficient to have collapsed the barostat capsule and withdrawn the pin from the escapement. The gear thus commences to work, and the barrel 53 of the time device to move upwards. After several seconds the barrel pushes the latch spindle lever 47 withdrawing the latch 46. This releases the split tail 44 of the drogue hook 45 which flies upwards and forwards releasing the shackle 73 and thus the drogue parachute from the seat and simultaneously permitting the cranked cross member 42 to rotate and the lock actuating springs 39 to release the locks thus freeing the attachment of the pilot and his parachute pack from the seat.

The drogue parachute when freed from the seat, through the extension of the drogue cable 74 pulls out the securing pin on the inner set of flaps in the parachute pack and then pulls out the main parachute from the pack which is still securely attached to the pilot's back. This action draws the pilot from the seat which falls freely downwards below the pilot. Since the seat is below the pilot all danger of the seat overtaking the pilot and collapsing his parachute is avoided.

For ejection at low altitudes the same operation is carried out except that the barostat device does not function.

In the event of the seat becoming inoperable due to enemy action or any other cause, the pilot could avail himself of the manual release and endeavour to leave the cockpit as best he may.

In the arrangement under consideration the pilot and his equipment are attached to the seat at nine points, omitting the oxygen and radio connections which pull out freely. The system of locks provides six of these points, the other are the drogue main cable, the drogue line to the drogue piston and the firing cable.

To detach these points the manual control lever 62 is operated. This through the cable connection 65 to the latch spindle lever (43, 67) withdraws the latch 46.

Figure 9:
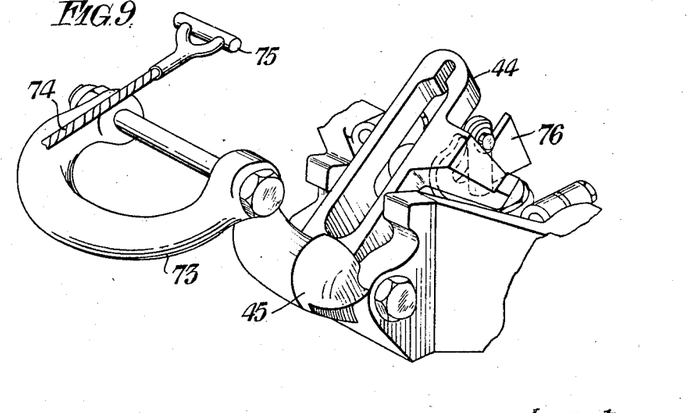

The dogue hook 44, 45, described has a split tail straddling the firing pin of the main ejector gun at the point where the firing cable 74a connects to the sear. Two projections 75 on the eye end of the firing cable lie across the arms which comprise the split tail of the drogue hook. Upward movement of the drogue hook pushes on the projections on the eye end of the firing cable forcing the eye end upwards out of engagement with the sear 76 (see Figs. 8 and 9). This operation follows naturally from the manual release of the latch and serves to disconnect simultaneously the firing cable 74a and the main parachute cable.

The operation of releasing the locks accompanied by an upward movement of the linkage serves to release the drogue line connection to the drogue piston by causing the projection 72 on the double sear bar to contact and lift the hook 67 within the sleeve on the drogue piston, thus freeing the ring 69 and breaking the last connection with the seat. After clearing the aircraft the rip cord may be pulled thus releasing the drogue which instantly pulls out the main parachute.

Use may be made of the manual release at any stage of ejection, i. e. in the event of failure of the drogue gun the drogue parachute would not be ejected with consequent spinning of the seat. If the time delay mechanism is working release from the seat is automatic and recourse to the manual control unnecessary. If, on the other hand, the drogue gun works, but the delay device does not, the manual control would have to be used, although subsequent use of the rip cord would not be necessary in this case.

In ground handling to remove the parachute pack from the aircraft it is only necessary to operate the manual control. This releases the pack at all points and at the same time making the seat safe by disconnecting the firing cable.

An alternative method of lock control would be to dispense with the operating springs 39 and substitute a releasable connection from the drogue attachment line to a lever on the top cross shaft in the linkage system. When the drogue is released from its hooked lever the extension line would rotate the cross shaft through a governed angle before pulling free. The rotation of the cross shaft would release the locks in a similar manner to that already described.

Figure 13:
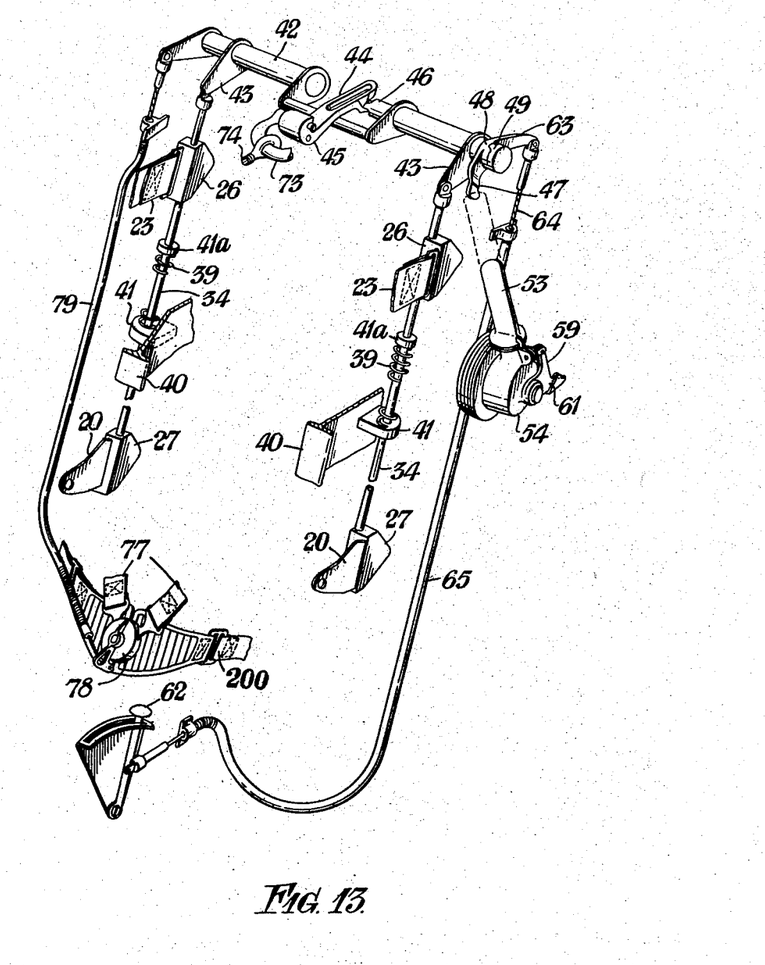
Fig. 13 an alternative method of harness release.

Fig. 13 shows an alternative method of safety harness release. In this case the safety harness and the parachute harness would be separate items of a conventional type. As the lap straps 200 would be permanently secured to the seat pan at their rearward extremities the locks 28, 37 and 38 on the seat pan would be dispensed with. The rearward extremities of the shoulder straps 77 would be bolted to the main seat frame instead of to locks 27. The forward extremities of the lap straps and the shoulder straps 77 would be connected by means of a harness box 78 from which they would be released at the moment of separation of the pilot from the seat by the cable 79.

Figures 14, 15:
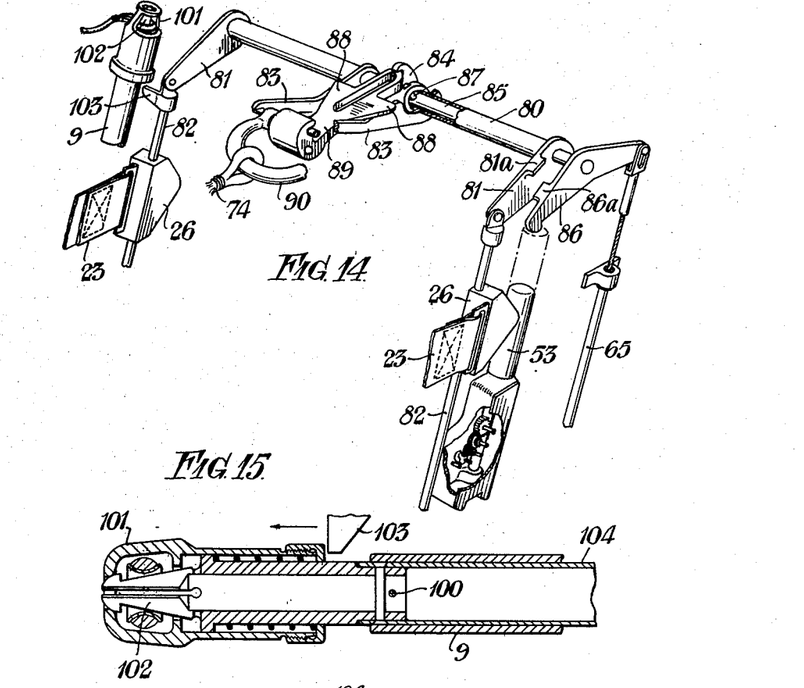
Fig. 14 another method of lock release.
Figs. 15, 16 and 17 show a preferred method of detachably securing the drogue line to the drogue gun piston.

An alternative and preferred method of operation for the lock release on automatic ejection seat is shown by Fig. 14. It consists of a hollow tubular torque shaft 80 mounted at the rear of the top cross beam of the seat. At each end of this shaft is mounted a lever 81 which is attached to the upper extremity of the linkage 82. Closely spaced in the middle of the shaft are two further levers 83. On the shaft between the levers 83 is mounted the latch 84. This latch is controlled by a spindle 85, which lies within the bore of the torque shaft. At the outer end of the spindle 85 is a rocker lever 86, and at the inner end the spindle is forked to engage a pin 87 which runs through short annular slots in the wall of the torque shaft. Two lugs 88 projecting from the split tail of the drogue retaining latch 89 lie across the levers 83. When the drogue retaining latch 89 is locked down by latch 84, the projecting lugs serve to hold down the levers 83, thus keeping the locks 26, 27 and 28 in the locking position. On the rocker lever 86 is a small lug 86a which on extreme movement contacts a similar lug 81a on the outer torque shaft lever.

When the upward moving barrel of the time delay mechanism partially rotates the rocker lever 86, the movement is transmitted through the spindle 85 to the latch 84; thus releasing the drogue latch 89, and freeing the drogue shackle 90. As the drogue shackle escapes from the latch in an upward direction, extensions on the shackle pin lift the levers 83; this motion is transmitted through the torque shaft 80 and the levers 81 to the linkage 82, and the locks are withdrawn.

In the case of manual operation the hand lever is pulled. This movement rotates the rocker lever 86 the first part of the motion releases the latch 84 as previously described. Further movement causes the lug 87 to contact the lug 88 and rotate the torque shaft, thus releasing locks. At the same time the upward movement of the levers 83 moves the drogue retaining latch 89, thus freeing the drogue shackle, and also uncocking the firing mechanism.

Figure 16:
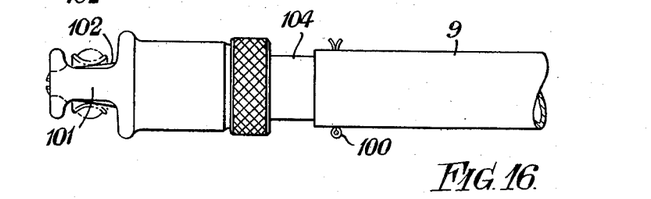
Figure 17:
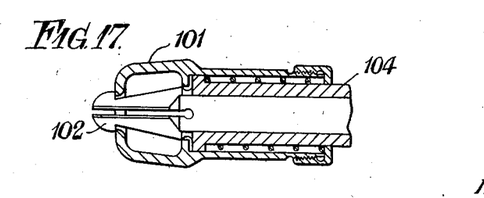

The drogue gun piston is normally arranged as shown at Figs. 15, 16 and 17.

When the drogue gun fires, the upward moving piston 104 shears the split pin 100, and, due to the inertia of the top cap assembly 101, the split cone 102 is forced through the ring of the top cap assembly into the position shown at Fig. 17. This locks down the top cap assembly onto the piston, and prevents the drogue attachment line and the thimble becoming detached from the piston.

When using the manual release from the seat, the arm 103 on the upward moving locks contacts and lifts the top cap assembly against the internal spring thus releasing the drogue line and thimble from the piston.

The face screen is releasably secured at one end to the seat or to the parachute container. In the first case it is necessary that the screen should be released when the harness and drogue parachute are released. In the second case it is not essential that it should be released.

As many embodiments of the present invention may be made, and the parts herein described may be varied without departing from the scope of the invention, it is to be understood that all matter herein set forth or shown in the accompanying drawings is to be interpreted as illustrative and not in a limiting sense.

I claim:

1. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, means to release the drogue parachute from the seat when the seat is free of the aircraft and to release the harness from the seat lock mechanism, a connection between the drogue parachute and the main parachute, allowing the drogue parachute after release to draw out the main parachute, the pilot thus being freed entirely from the seat to enable him to make a normal parachute descent, means for locking the said release means and a time delay mechanism for releasing said locking means, the time delay mechanism being set, as the seat is ejected from the aircraft, to become operative after a predetermined time interval.

2. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the seat, a connection between the drogue parachute and the main parachute, means to release the drogue parachute from the seat and also to release the harness from the seat lock mechanism, the drogue parachute then drawing out the main parachute, the pilot thus being freed entirely from the seat to enable him to make a normal parachute descent, means for locking the said release means and a time delay mechanism for releasing said locking means, the time delay mechanism being set, as the seat is ejected from the aircraft, to become operative after a predetermined time interval.

3. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute and harness, of seat lock mechanism for locking the harness to the seat, a common pack divided into upper and lower compartments, the drogue parachute being in the upper compartment and the main parachute in the lower compartment, connections from the drogue parachute to the drogue gun, the seat frame, and to the main parachute, means to release the drogue parachute from the seat and to release the harness from the seat lock mechanism, the drogue parachute then drawing out the main parachute, the pilot thus being freed entirely from the seat to enable him to make a normal parachute descent, means for locking the said release means and a time delay mechanism for releasing said locking means, the time delay mechanism being set, as the seat is ejected from the aircraft, to become operative after a predetermined time interval.

4. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the seat, a connection between the drogue parachute and the main parachute, means to release the drogue parachute from the seat and to release the harness from the seat lock mechanism, the drogue parachute then drawing out the main parachute, the pilot thus being freed entirely from the seat to enable him to make a normal parachute descent, means for locking the said release means, a time delay mechanism for actuating said locking means, the time delay mechanism being set, as the seat is ejected from the aircraft, to become operative after a predetermined time interval, and an overriding manual control.

5. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat locks cooperating with a sear bar for locking the harness to the seat, a releasable connection between the drogue parachute and the seat, means to release the harness from the seat locks, a connection between the drogue parachute and the main parachute to draw the latter out after said release, the pilot thus being freed entirely from the seat to enable him to make a normal parachute descent, means for locking the said release means, and a time delay mechanism for releasing said locking means, the time delay mechanism being set, as the seat is ejected from the aircraft, to become operative after a predetermined time interval.

6. The combination in an ejection seat for aircraft having a frame on which the seat is mounted, a guide adapted to be fixed in the aircraft so as to be directed toward an outlet from which the seat may be ejected, an ejection gun operating between the seat frame and fixed part of the aircraft to eject the seat and its frame along the guide, a main parachute, a drogue gun, a drogue parachute connected thereto and harness, of seat lock mechanism for locking the harness to the seat, a releasable attachment hook between the drogue parachute and the seat, a connection between the drogue parachute and the main parachute, release means comprising a cranked torque shaft, members controlling said seat lock mechanism, a member engaging said drogue parachute releasable connection, said means when actuated releasing the drogue parachute from the seat and releasing the harness from the seat lock mechanism, the drogue parachute then drawing out the main parachute, the pilot thus being freed entirely from the seat to enable him to make a normal parachute descent, a latch member normally holding said release means against movement and a time delay mechanism actuating said latch member, the time delay mechanism being set, as the seat is ejected from the aircraft, to become operative after a predetermined time interval.

7. A releasable attachment hook according to claim 6, having a tail portion normally lying across the cranked portion of the torque shaft.

8. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable attachment hook between the drogue parachute and the seat, a connection between the drogue parachute and the main parachute, release means comprising a hollow torque shaft, members controlling said seat lock mechanism, the releasable hook having a tail portion with projecting lugs lying across levers on the torque shaft, said means when actuated releasing the drogue parachute from the seat and releasing the harness from the seat lock mechanism, the drogue parachute then drawing out the main parachute, the pilot thus being freed entirely from the seat to enable him to make a normal parachute descent, a latch member normally holding said release means against movement and a time delay mechanism actuating said latch member, the time delay mechanism being set, as the seat is ejected from the aircraft, to become operative after a predetermined interval.

9. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the seat, a connection between the drogue parachute and the main parachrute, means to release the drogue parachute from the seat and also to release the harness from the seat lock mechanism, the drogue parachute then drawing out the main parachute, the pilot thus being freed entirely from the seat to enable him to make a normal parachute descent, means for locking said release means, and a time delay mechanism consisting of a train of gears and an escapement for actuating said locking means, the time delay mechanism being set, as the seat is ejected from the aircraft, to become operative after a predetermined time interval.

10. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the main parachute, means to release the drogue parachute from the seat and also to release the harness from the seat lock mechanism, the drogue parachute then drawing out the main parachute, the pilot thus being freed entirely from the seat to enable him to make a normal parachute descent, means for locking the said release means, a time delay mechanism for releasing said locking means, and a barostat device controlling said mechanism the time delay mechanism being set, as the seat is ejected from the aircraft, to become operative after a predetermined time interval.

11. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the seat, a common pack divided into upper and lower compartments, the drogue parachute being in the upper compartment and the main parachute in the lower compartment, a connection between the drogue parachute and the main parachute, means to release the drogue parachute from the seat and to release the harness from the seat lock mechanism, the drogue parachute then drawing out the main parachute, the pilot thus being freed entirely from the seat to enable him to make a normal parachute descent, means for locking the said release means, and a time delay mechanism for releasing said locking means, the time delay mechanism being set, as the seat is ejected from the aircraft, to become operative after a predetermined time interval.

12. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute connected thereto and harness, of seat lock mechanism for locking the harness to the seat, a releasable connection between the drogue parachute and the seat, a common pack divided into upper and lower compartments, the drogue parachute being in the upper compartment and the main parachute in the lower compartment, a connection between the drogue parachute and the main parachute, means to release the drogue parachute from the seat and to release the harness from the seat lock mechanism, the drogue parachute then drawing out the main parachute, the pilot thus being freed entirely from the seat to enable him to make a normal parachute descent, means for locking the said release means, a time delay mechanism for actuating said locking means, and a barostat device controlling said mechanism the time delay mechanism being set, as the seat is ejected from the aircraft, to become operative after a predetermined time interval.

13. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute, safety harness and parachute harness, of seat lock mechanism and a harness box for securing the harnesses, means to release the drogue parachute from the seat and to release the harnesses from the seat lock mechanism and the harness box, the drogue parachute then drawing out the main parachute, the pilot thus being freed entirely from the seat to enable him to make a normal parachute descent, means for locking the said release means, and a time delay mechanism for releasing said locking means, the time delay mechanism being set, as the seat is ejected from the aircraft, to become operative after a predetermined time interval.

JAMES MARTIN.

REFERENCES CITED

The following references are of record in the file of this patent:

UNITED STATES PATENTS

| Number | Name | Date |
|---|---|---|
| 1,800,575 | Tofflemire | Apr. 14, 1931 |
| 2,459,948 | Lobelle | Jan. 25, 1949 |
| 2,467,763 | Martin | Apr. 19, 1949 |
| 2,470,457 | Bancora | May 17, 1949 |